Jan. 7, 1958 C. A. WHITTAKER 2,818,731
SURFACE RECORDING UNDERWATER PRESSURE MEASURING DEVICE
Filed May 29, 1956

ZERO    CALIBRATE

INVENTOR
CLYDE A. WHITTAKER

BY
ATTORNEYS

United States Patent Office 2,818,731
Patented Jan. 7, 1958

2,818,731

SURFACE RECORDING UNDERWATER PRESSURE MEASURING DEVICE

Clyde A. Whittaker, Panama City, Fla., assignor to the United States of America as represented by the Secretary of the Navy Application May 29, 1956, Serial No. 588,198

3 Claims. (Cl. 73—301)

(Granted under Title 35, U. S. Code (1952), sec. 266)

The invention herein described may be manufactured and used by or for the Government of the United States of America for governmental purposes without the payment of any royalties thereon or therefor.

The present invention relates to pressure measuring apparatus and more particularly to the measuring and recording of relatively short term pressure variations under water caused by swells, waves, the passage of ships and the like.

The present invention comprises an improvement of the apparatus for measurement of pressure variations disclosed and claimed in application Serial No. 520,638, filed July 7, 1955, in the names of Clyde A. Whittaker and Roy E. Donegan.

In pressure variation measuring apparatus such as disclosed in the above identified patent application both the zero line and the center line during a calibration deflection have swell pressure variations superimposed such that it is difficult to determine exactly the zero center line and the amount of deflection during calibration.

It is an object of the present invention to provide in measuring apparatus of this type means providing a straight line for both the zero value and the deflected value during calibration.

Another object of the invention is to provide pressure measuring apparatus in which hydrostatic compensation is rapidly achieved so that the instrument is immediately useful when lowered into the water.

Other objects and many of the attendant advantages of the invention will be readily appreciated as the same becomes better understood by reference to the following detailed description when considered in connection with the accompanying drawings.

In accordance with the invention a differential pressure pickup device of the type having two oil filled compartments, one of which provides the average sea pressure and the other of which is subject to instantaneous sea pressure, is provided with a valve between the two compartments which is arranged so that it may be actuated progressively through a three step cycle, viz., the valve is closed, the valve is open, and the valve is open and a calibration circuit completed. This valve is made to have sliding action so that it may operate without altering the volume of either of the compartments when it is actuated to close or open communication between these compartments.

The preferred embodiment of the invention to be described in detail is illustrated in the accompanying drawing wherein Fig. 1 is a side view partly in section of the differential pressure pickup;

Figure 1:
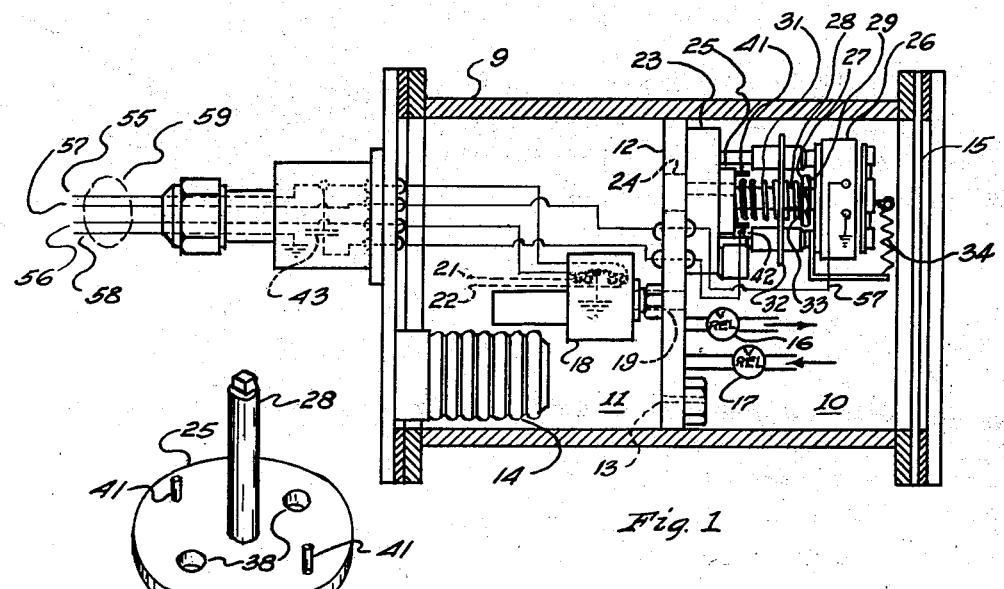
Figure 3:
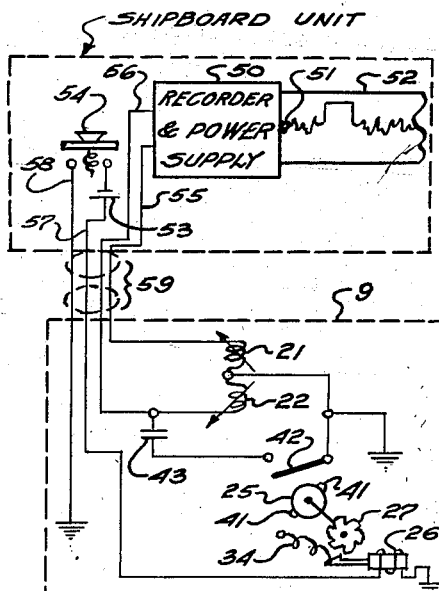
Fig. 3 is a schematic diagram of the complete pickup and recording units.

As shown in Fig. 1, a hydraulic pressure pickup system 9 incorporating the invention is comprised of a front compartment 10 and a rear compartment 11 separated by a bulkhead 12 and filled with oil or other relatively incompressible fluid. The two compartments 10 and 11 are connected by a small orifice 13 which functions as a breather tube for compensating for long term pressure variations such as are caused by tides or other changes in water level. The rear compartment 11 also contains an air filled spring loaded bellows 14 which together with the small orifice 13 provides a low pass hydraulic filter, the orifice 13 functioning as a hydraulic resistance while the bellows 14 acts as a hydraulic compliance. The outer wall of the compartment 10 is closed with a flexible diaphragm 15 of negligible stiffness so that it transmits instantaneous sea pressure changes to the compartment 10. Rapid variations in pressure transmitted by the diaphragm 15 will not be passed by the hydraulic filter consisting of the orifice 13 and the bellows 14, but long term changes in static pressure equivalent to the depth of the water at the pickup unit will be transmitted by this filter which preferably has a time constant of five or more minutes, where the time constant is defined as the time required for a pressure difference to be reduced to $1/e$ of its initial value. The bulkhead 12 is also provided with two oppositely directed pressure relief valves 16 and 17 which function to limit the maximum pressure difference which can exist in either direction between the compartments 10 and 11 to a harmless value of about five pounds per square inch. A differential pressure sensing unit 18 has one side exposed to the pressure in the compartment 11 and its other side exposed to the pressure in compartment 10 through a suitable opening 19 in the bulkhead 12. As is fully described in the above identified application of Whittaker and Donegan, this pressure pickup unit 18 varies the inductance of pickup coils 21 and 22 which form two arms of a Wheatstone bridge, the other two arms of which are located at the surface. The surface unit which may be shipborne includes as shown in Fig. 3 a recorder 50 having a stylus 51 which marks a suitable record strip 52 in accordance with changes in the unbalance of the Wheatstone bridge, a battery 53 and a manually actuated switch 54. This shipborne unit is connected to the submerged pickup unit 9 by the four conductors 55, 56, 57 and 58 of a cable 59.

Figure 2:
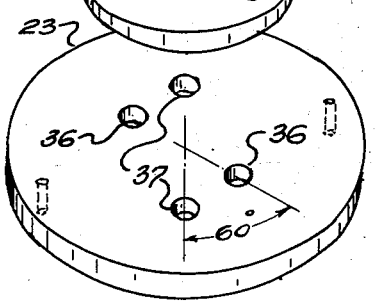
Fig. 2 is an exploded view in perspective of the sliding valve.
Figure 4:
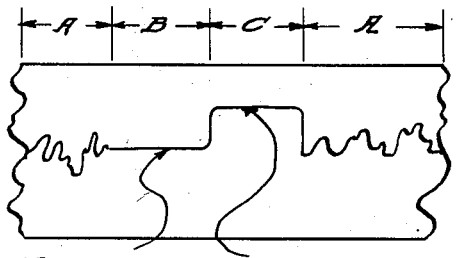
Fig. 4 is a section of a recording showing the straight-line location of zero and calibrating deflections of the recording instrument.

In accordance with the invention a valve seat 23 is mounted on the bulkhead 12 in alinement with an opening 24 therein and is provided with a cooperating valve disc 25 which is adapted to be rotated step by step by suitable means such as a rotary solenoid 26 operating through a one-way clutch 27, here shown as being of the claw type, mounted between a stem 28 provided on the valve disc 25 and the oscillating drive shaft 29 of the rotary solenoid 26. A spring 31 under compression between the valve disc 25 and a backing plate 32 serves to hold the disc 25 in nonleaking engagement with the valve seat 23, while another spring 33 under compression between the backing plate 32 and one-half of the claw clutch 27 yieldingly urges the two claw faces together. When the solenoid 26 is energized as hereinafter described it rotates through a predetermined angle against the tension of a spring 34 which returns the solenoid to its starting position when it is de-energized. The angle through which the solenoid 26 rotates each time it is energized should be such that three or a multiple of three rotative steps will complete an angle of 360 degrees. In the present instance it is preferred to employ a solenoid having a 60 degree angle of throw and the openings in the valve seat 23 and the valve disc 25 are arranged to provide for a three step cycle to repeat itself as the solenoid 26 is repeatedly energized. One suitable arrangement is shown in Fig. 2 wherein the valve seat 23 is provided with two pairs of fluid controlling ports 36 and 37 arranged respectively on diameters angularly spaced by 60 degrees, while the valve disc 25 has a single pair of diametrically disposed ports 38 which may be rotated into full register with the ports 36 or the ports 37, or moved completely out of communication therewith. As shown in Fig. 2 the valve disc 25 is oriented with respect to the valve seat 23 so that the ports 38 are alined on a diameter of the seat 23 which makes an angle of 60 degrees with each of the diameters defined by the pairs of ports 36 and 37, respectively. In this position the valve is closed and the pressure pickup unit responds to pressure variations in the normal manner to provide the "A" sections of the recording shown in Fig. 4. Upon rotation of the valve disc 25 clockwise through 60 degrees, its ports 38 will be fully alined with the valve seat ports 36 and no pressure difference will exist between the compartments 10 and 11 so that the recording instrument will draw a straight line occupying the center position corresponding to zero deflection as indicated in section "B" of the record in Fig. 4. Upon rotation of the valve disc 25 clockwise through another 60 degrees its ports 38 will be alined with the valve seat ports 37 to again equalize the pressure between the compartments 10 and 11, but, as described below, in this position one of the contacts 41 carried by the valve disc 25 will have completed a calibrating circuit so that now the recorder will draw a straight line corresponding to the calibration deflection of the instrument as indicated in section "C" of the record shown in Fig. 4.

It is highly desirable that the valve be of a latching type so that it will not require current flowing through the connecting cable to hold the valve in one position since current flowing in the cable upsets the bridge characteristics. The valve does not have to have a perfect seal but must have a leak rate lower than the orifice between the two compartments in the pressure pickup so that the leakage between the two compartments may be controlled by varying the orifice size. The maximum pressure which the valve must withstand is the water pressure corresponding to the maximum signal the recording system is designed to operate on and which in a preferred embodiment is forty inches of water. In actual practice it is preferred to keep the valve leakage below four cubic centimeters per eight hours with a head of forty inches of water pressure using 100 centistoke viscosity fluid.

Referring again to Fig. 3 where the showing of the valve disc 25, the one-way clutch 27, and the solenoid 26 are highly conventionalized, it will be noted that for every third 60 degree advancing movement of the solenoid 26 one of the contacts 41 closes a switch 42 to complete a circuit through a calibrating impedance here shown as a condenser 43 to connect this impedance 43 in shunt with one of the pickup coils, here shown as being coil 22. The solenoid 26 may be energized at will by momentarily pressing the push button switch 54 to complete the circuit from ground through the solenoid 26, lead 57, battery 53, switch 54 and lead 58 to ground.

When it is desired to measure or record pressure variations on the ocean floor caused by swells, waves, the passage of ships, or the like, the pickup unit 9 is lowered to the bottom. The relief valves 16 and 17 prevent any build-up of an excessive pressure difference between the two compartments 10 and 11 which might otherwise occur if the unit 9 is lowered to or raised from a considerable depth, say one hundred feet, at a rate such that compensation could not be provided by the filter elements 13 and 14. Although the relief valves 16 and 17 are desired safety features it is preferred practice to have the operator set the valve 25 at open position to provide full compensation during lowering and raising of the pickup unit 9 and recording can commence as soon as the pickup unit reaches the bottom by the operator causing the valve 25 to move to closed position.

At the start, at the end, and at intervals during a recording period the operator by suitably manipulating the switch 54 can cause to be marked on the record strip 52 straight line values of the zero center line and of the calibrating deflection. These straight line values remove the guesswork and the accompanying errors which heretofore plagued the operator or other person charged with analyzing a recording of underwater pressure variations such as are caused by surface waves and the like.

Although a preferred embodiment of the invention has been illustrated and described to make clear the novel features thereof, it will be obvious to those skilled in the art that the invention may take modified forms to meet the requirements of various forms of pressure sensing equipment, and it is therefore intended to cover by the appended claims all such modifications which fall within the spirit and scope of the invention.

What is claimed is:

1. In apparatus for measuring underwater pressure variations due to the overhead passage of waves and swells in which a pressure-difference sensitive element varies an impedance in a bridge circuit to provide a pressure reading and in which the calibration of the apparatus is checked by inserting a known impedance in the bridge circuit, an underwater pressure pickup unit comprising a liquid filled fluid tight container, an inner wall separating the container into two compartments one of which has rigid walls and a gas filled compressible bellows and the other of which has a flexible outer wall adapted to be subjected to sea pressure, a differential pressure sensing device mounted to be subjected to the pressures in the two compartments, a breather orifice in the inner wall to provide for slow equalization of pressure in the two compartments, a normally closed rotary slide valve mounted in the inner wall and having three positions in which it is, respectively, closed, open and open, for providing in each of its open positions rapid pressure equalization in the two compartments, surface controlled means for rotating the slide valve step by step from one position to the next in sequence, a calibrating circuit, and means operative to close the calibrating circuit when the valve moves from open position to open position and to interrupt the calibrating circuit when the valve moves from open position to closed position.

2. In apparatus for recording pressure variations under water caused by the overhead passage of waves and swells, a recording instrument including a moving chart and means for marking the chart, an underwater unit including a differential pressure transducer for controlling said instrument, means exerting an average sea pressure on one side of said transducer, means exerting an instantaneous sea pressure on the other side of said transducer, and a normally closed valve arranged when open to subject said transducer to zero pressure difference, means controlled at the surface for opening said valve whereby the recording instrument marks the zero line on the chart, and additional means controlled at the surface for simulating an output of the transducer corresponding to a predetermined pressure difference while the normally closed valve is open, whereby the recording instrument marks a straight line for calibration.

3. Apparatus for recording pressure variations according to claim 2 in which the normally closed valve latches in both closed and open positions and the surface controlled means for opening said valve is electrically actuated, whereby no control current is required to be flowing during a recording action.

References Cited in the file of this patent
UNITED STATES PATENTS

| 2,466,071 | Barnes et al. | Apr. 5, 1949 |
| 2,600,324 | Rappaport | June 10, 1952 |
| 2,637,999 | Klebba | May 12, 1953 |
| 2,718,145 | Nisle | Sept. 20, 1955 |